(12) United States Patent
Baumann

(10) Patent No.: US 8,398,160 B2
(45) Date of Patent: Mar. 19, 2013

(54) ROOF STRUCTURE OF A BODY OF A MOTOR VEHICLE

(75) Inventor: Karl-Heinz Baumann, Bondorf (DE)

(73) Assignee: Daimler AG, Stuttgart (DE)

( * ) Notice: Subject to any disclaimer, the term of this patent is extended or adjusted under 35 U.S.C. 154(b) by 138 days.

(21) Appl. No.: 12/809,496

(22) PCT Filed: Nov. 26, 2008

(86) PCT No.: PCT/EP2008/010008
§ 371 (c)(1),
(2), (4) Date: Oct. 4, 2010

(87) PCT Pub. No.: WO2009/077065
PCT Pub. Date: Jun. 25, 2009

(65) Prior Publication Data
US 2011/0012390 A1 Jan. 20, 2011

(30) Foreign Application Priority Data
Dec. 19, 2007 (DE) .......................... 10 2007 061 208

(51) Int. Cl.
*B62D 25/06* (2006.01)
*B60N 2/01* (2006.01)
(52) U.S. Cl. ............... 296/210; 296/187.13; 296/193.12
(58) Field of Classification Search ............. 296/203.01, 296/187.01, 210, 84.1, 187.13, 193.12
See application file for complete search history.

(56) References Cited

U.S. PATENT DOCUMENTS

| | | | |
|---|---|---|---|
| 2,864,646 A | 12/1958 | Wilfert | |
| 4,729,596 A | 3/1988 | Fujihara et al. | |
| 5,009,463 A * | 4/1991 | Saitoh et al. | 296/210 |
| 5,538,309 A * | 7/1996 | Murray | 296/64 |
| 7,802,842 B2 * | 9/2010 | Vogt et al. | 296/210 |
| 2012/0161476 A1 * | 6/2012 | Baccouche et al. | 296/203.01 |

FOREIGN PATENT DOCUMENTS

| | | |
|---|---|---|
| DE | 967 940 C | 12/1957 |
| DE | 31 12 686 A1 | 10/1982 |
| EP | 0 677 002 B1 | 10/1995 |
| EP | 0 985 593 A1 | 3/2000 |
| FR | 1 357 298 | 4/1964 |
| GB | 2 098 552 A | 11/1982 |
| SU | 1632856 A1 | 3/1991 |

OTHER PUBLICATIONS

International Search Report (Form PCT/ISA/210) dated Feb. 12, 2009 with partial English translation, including Forms PCT/ISA/220 and PCT/ISA/237 (Fifteen (15) pages).

* cited by examiner

*Primary Examiner* — Glenn Dayoan
*Assistant Examiner* — Melissa A Black
(74) *Attorney, Agent, or Firm* — Crowell & Moring LLP

(57) ABSTRACT

In a roof structure for the body of a motor vehicle with front roof pillars which are interconnected via a roof frame element, the roof frame element is arranged in a center section of the roof structure in relation to the connecting section thereof to the respective roof pillar so as to be set back in the longitudinal vehicle direction.

12 Claims, 3 Drawing Sheets

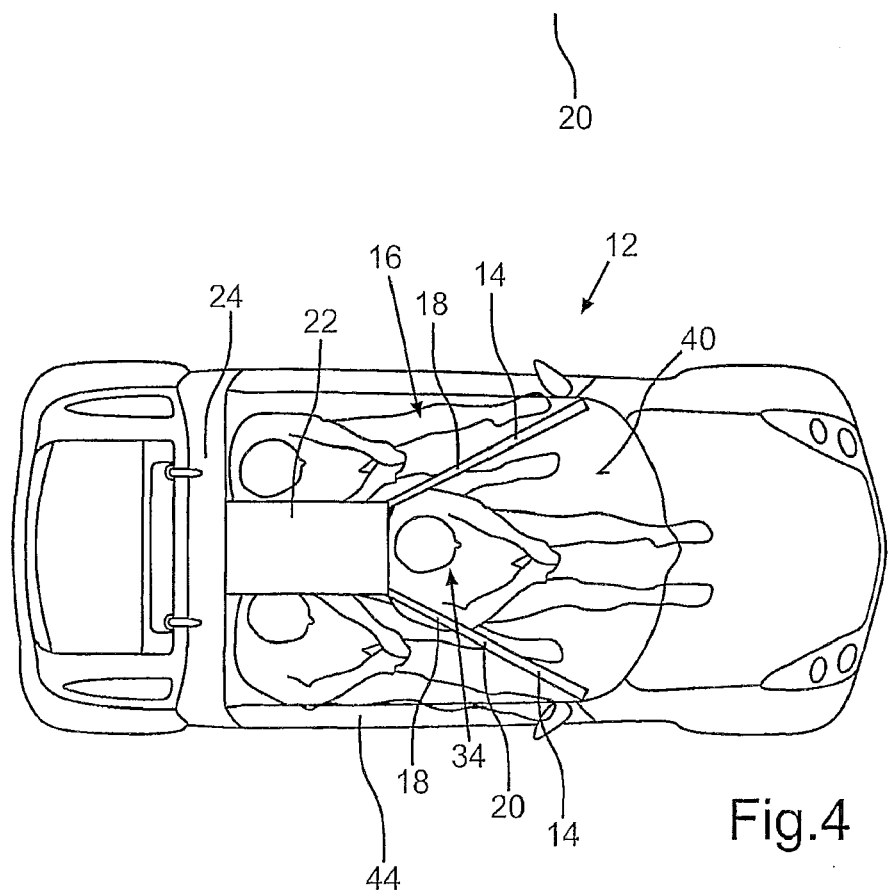
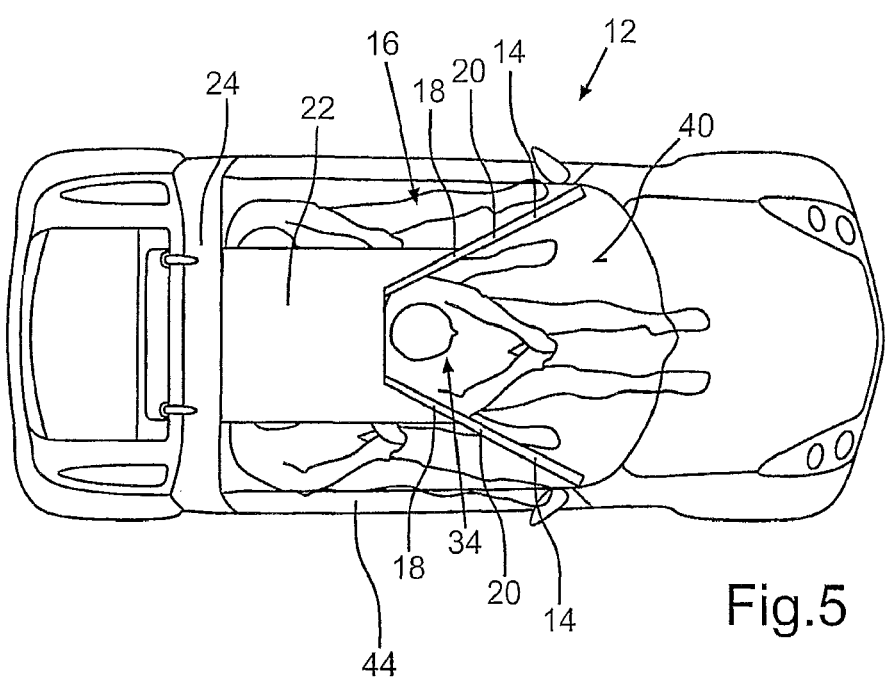

ROOF STRUCTURE OF A BODY OF A MOTOR VEHICLE

BACKGROUND AND SUMMARY OF THE INVENTION

This application is a national stage of PCT International Application No. PCT/EP2008/010008, filed Nov. 26, 2008, which claims priority under 35 U.S.C. §119 to German Patent Application No. 10 2007 061 208.9, filed Dec. 19, 2007, the entire disclosure of which is herein expressly incorporated by reference.

The invention relates to a roof structure for the body of a motor vehicle with front roof pillars that are connected to each other by a roof frame element.

A roof structure of this general type is disclosed, for example, in European patent document EP 0 677 002 B1, in which two front roof pillars in the form of A pillars extend upwards to a respective connection region to a roof frame element starting from a front face of the chassis of the motor vehicle. This roof frame element is formed as a roof transverse beam, which extends to the respective roof pillars starting from the respective connection regions. The roof frame element thus represents a conventional front roof transverse beam, which forms a windshield frame together with the front roof pillars and thus delimits the windshield upwardly. The roof frame element or the entire windshield frame is thereby supported to the rear by two roof bows proceeding in the longitudinal vehicle direction, which are spaced laterally from each other. These two roof bows are supported at a rear bracket element, which itself is fastened to a rear front face of the motor vehicle body or the passenger compartment.

It is in particular problematic with such a roof structure that the occupants in the passenger compartment dislocate forward for example during a frontal impact of the motor vehicle. In particular on the front vehicle seats (that is, the driver and front passenger), there is often the problem, in particular with vehicles having a low roof structure, that the forward dislocation of the head caused by the crash can lead to an undesired head contact with the front roof frame element. It is obvious that such a head contact increases the risk of injury enormously with such a collision. A further disadvantage of the given roof structure consists in that the view to the front is also limited.

German patent document DE 967 940 C1 discloses a framework for a vehicle construction of a motor vehicle, which is arranged in the manner of a roll-over cage in the region of the passenger compartment of the motor vehicle. This framework thereby comprises a lower part, on which is placed an upper part. The lower part and the upper part are thereby formed by tube elements, which are arranged on the inside of the actual body or strengthen these in the manner of a roll-over cage. In other words, the individual tube profiles of the lower part or of the upper part lie behind those parts which form the actual structure of the motor vehicle body.

One object of the present invention, therefore, is to create a roof structure and a body of a motor vehicle of the type mentioned above, where the occupants of the passenger compartment are subjected to a risk of injury as low as possible during a forward displacement caused by an accident.

This and other objects and advantages are achieved by the roof structure, according to the invention, in which the roof element in relation to its connecting region to the respective roof pillar is arranged so as to be set back in a center region of the roof structure in the longitudinal vehicle direction. In other words, it is provided according to the invention, in contrast to the state of the art according to European patent document EP 0 677 002 B1, the roof element is not designed as a component extending straight in the transverse vehicle direction; rather, its center region is designed—starting from the respective connecting region to the corresponding roof pillar—so as to be set back. This can for example take place in a V-shaped manner, but it would in principle also be conceivable to use a roof frame element with an arcuate or semi-elliptical contour. As a result, it is achieved hereby that a seat occupant—in particular the driver or the front passenger—are subjected to a lower accident risk during a forward displacement caused by a crash, as a component of the roof frame element is no longer arranged in the evasion region, especially for the head. According to experience, the driver or the passenger are moved to the front in the center of the vehicle and upwards with such a forward dislocation caused by a crash, so that it is achieved by the relocation of the center region of the roof frame element in the longitudinal vehicle direction to the rear, that a contact of the head with the center region of the roof frame element cannot result.

A further advantage of such a set back arrangement of the center region of the roof frame element is that a much larger upward viewing region can be provided in particular for the front seat occupants. A windshield can thus be created, which does not only extend over the front face side but also into the upper region of the vehicle roof. It shall be mentioned thereby that this takes place while maintaining highest safety requirements, that is, the roof pillars are still supported against bending or the like by means of roof element in an optimum manner.

It is a further advantage of the arrangement of the roof frame element according to the invention that a holding system or safety belt system of the seat occupant can be designed in such a manner that a maximum forward dislocation path of the head can be used. In particular force peaks due to the forward dislocation caused by an accident can hereby be reduced considerably or be eliminated.

In a further arrangement of the invention it has additionally been shown to be advantageous if the roof frame element comprises two lateral roof frame parts, which extend from the respective connecting region to the corresponding roof pillar at an angle to each other to the roof center. In other words, it has thus been shown to be advantageous if the two roof frame parts are arranged to each other in an essentially V-shaped manner, as the roof frame element is arranged so as to altogether be set back in a center region and furthermore a simple design of the roof frame element results.

In a further arrangement of the invention, the roof frame element comprises a center roof frame part, via which the two lateral roof frame parts are connected to each other. This center roof frame part preferably extends in the longitudinal vehicle direction in a further arrangement of the invention, so that altogether a Y-shaped roof frame element results. This roof frame element has for example the advantage that the center roof frame part can be supported towards the rear, so that altogether an extremely stiff and stable roof structure results, for example also with a rollover of the motor vehicle.

A particularly favorable support of the center roof frame part of the roof frame element can be created if it is connected to a rear transverse roof element of the roof structure, in particular to a roll-over bar of the body. A center roof frame part can thus altogether be created, by means of which the front lateral roof frame parts can be supported towards the rear in a particular reliable and stable manner.

The center region of the roof frame element or the point where the two lateral front roof frame parts are connected to each other via the center roof frame part, is preferably set back by about one to two thirds, and in particular about the half of the length of the roof structure in the longitudinal vehicle direction. A particularly favorable arrangement of the roof frame element can hereby be created on the one hand with a forward dislocation caused by an accident in particular of the head of the respective seat occupant, and a particularly good view is possible for the seat occupants, in particular the driver.

In a further arrangement of the invention, the two lateral roof frame parts are arranged in an extension of the corresponding roof pillars. A roof structure that can be manufactured easily can be created hereby, in which the lateral roof frame parts and the associated roof pillars are possibly also formed in one part.

A further embodiment of the invention provides that respective roof elements are arranged laterally of the center roof frame part, which are formed in a detachable manner. An alternative vehicle concept can thus be created, for example in the manner of a targa.

It is furthermore advantageous if the side doors of the body in the region of the roof structure extend to the center roof frame part. Side doors can be created hereby, which enable a particularly simple entry and exit into the interior of the motor vehicle. The side doors can thereby possibly proceed into the roof region of the roof structure, that is, at right angles between the respective side wall and the roof region of the roof structure. Hereby, there is possibly also the possibility to design such a motor vehicle with wing doors.

The advantages set out above in connection with the structure according to the invention are valid in the same manner for other embodiments of the invention. This is in particular distinguished in that a front vehicle seat is arranged in the center of the body. In other words, a vehicle concept will be provided with the present body in which only one person, namely the driver, is positioned in the front in the center of the vehicle. This has in particular the advantage that the driver is protected correspondingly during a previously described forward dislocation caused by an accident, in that the center region of the roof frame element is arranged in a correspondingly set back manner. Hereby, not only the previously described reduction of the danger of head injuries results, but furthermore a particularly clear driver position is given by the arrangement of the center region of the roof frame element so as to be set back.

In a further arrangement of the invention it has finally been shown to be advantageous if two rear vehicle seats arranged laterally offset to the front vehicle seat are provided. These vehicle seats also have the particular advantage due to the special design of the roof frame element that the respective seat occupant is subjected to an extremely low risk of injury in particular of his head with a forward dislocation caused by an accident. A corresponding arrangement of the side doors has furthermore the advantage that the that the seat occupants of the rear vehicle seats have an exceptionally good view from the vehicle.

Other objects, advantages and novel features of the present invention will become apparent from the following detailed description of the invention when considered in conjunction with the accompanying drawings.

BRIEF DESCRIPTION OF THE DRAWINGS

FIG. 4 is a further schematic top view of the motor vehicle according to FIGS. 1 to 3, wherein the roof structure has an alternative embodiment, in which the two lateral front roof frame parts of the roof frame element proceed in the extension of the corresponding respective front roof pillar; and FIG. 5 is a further schematic top view of the motor vehicle according to FIGS. 1 to 4, wherein the roof frame element has a wider center roof frame part compared to the embodiment according to FIG. 4.

DETAILED DESCRIPTION OF THE DRAWINGS

Figure 1:
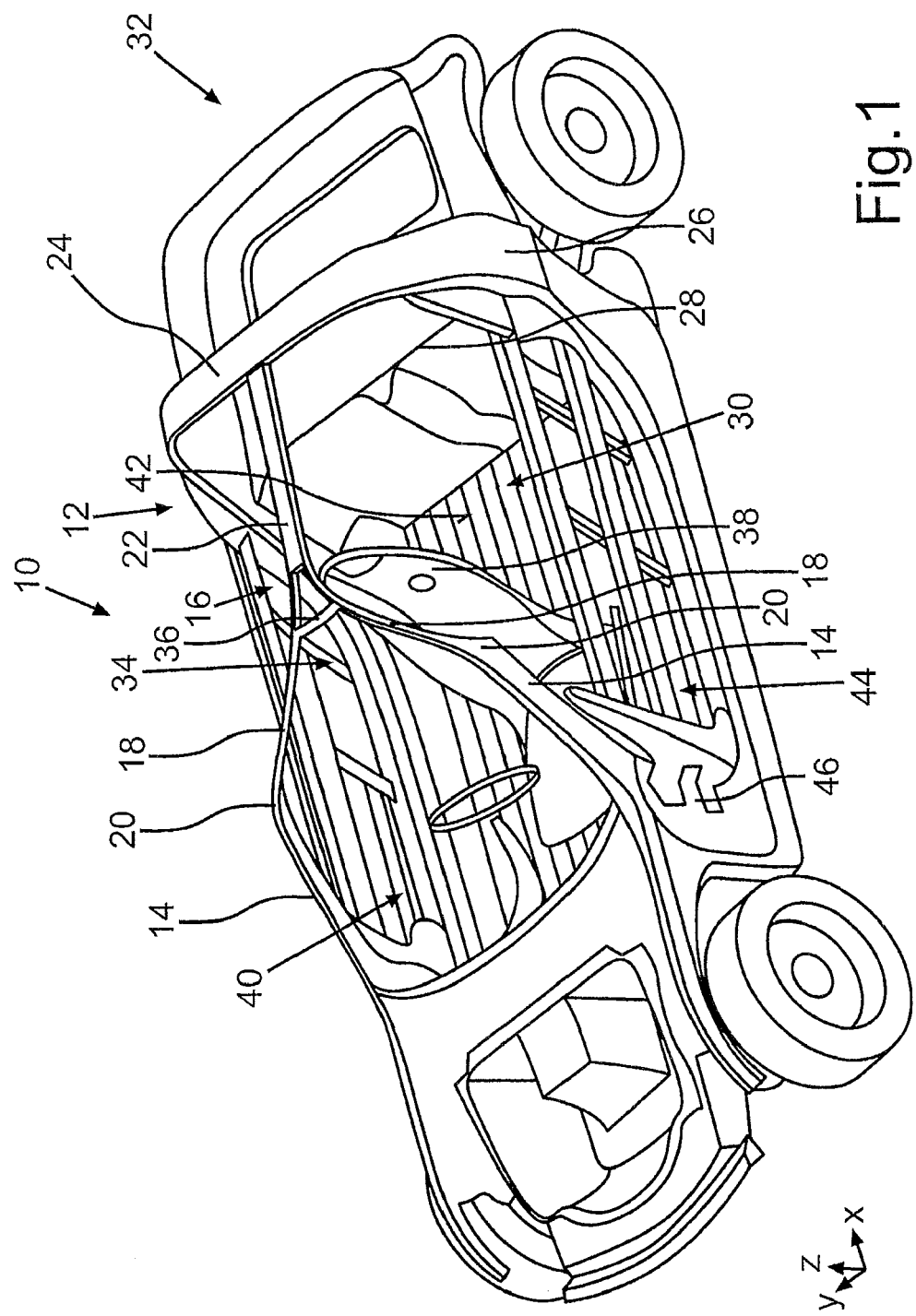
FIG. 1 is a perspective view of a body of a passenger motor vehicle, in which are provided a front vehicle seat arranged in the center of the vehicle body and two rear seats laterally offset with regard to the front vehicle seat (not shown), wherein the body of the motor vehicle comprises a roof structure with front roof pillars, which are connected to each other via a roof frame element, which is arranged in a center region of the roof structure with regard to its connecting region to the respective roof pillars so as to be set back in the longitudinal vehicle direction, and wherein the roof frame element comprises two lateral roof frame parts, which are connected to each other via a center roof frame part and are supported at a roll-over bar of the body towards the rear.

In FIG. 1 is shown a three door passenger motor vehicle in a schematic perspective view. A body 10 of the motor vehicle thereby comprises a roof structure 12 with front A pillars or roof pillars 14, which are connected to each other via a roof frame element 16.

The roof frame element 16 thereby comprises two front lateral roof frame parts 18, which extend from a respective connecting region 20 to the corresponding roof pillar 14 at an angle towards the roof center.

The two lateral roof frame parts 18 are thereby connected via a center roof frame part 22, which presently extends in the longitudinal vehicle direction. The center roof frame element 22 is connected to a rear transverse roof element 24 of the roof structure with a rear end region, which element is presently associated with a roll-over bar 26 of the body. The roll-over bar thereby proceeds—seen in the longitudinal vehicle direction—at the height of a rear face 28, which delimits the passenger compartment 30 from an engine space 32 therebehind.

As the two lateral front roof frame parts 18 proceed inclined to the rear to the roof center, the roof frame element 16 is arranged in a center region 34 of the roof structure 12 in relation to the its connecting regions 20 to the roof pillars 14 so as to be set back in the longitudinal vehicle direction. In contrast to the previously known state of the art, the center region 34 of the roof frame element 16 thus does not extend in the transverse vehicle direction between the two connecting regions 20, this center region 34 is rather formed so as to be set back in the longitudinal vehicle direction. In the present embodiment, the roof frame element 16 is set back by about one to two thirds, and in particular about the half of the length of the roof structure 12 in the longitudinal vehicle direction. In the present embodiment, a stay 36 still extends between the two lateral or front roof frame parts 18. This essentially proceeds in the transverse vehicle direction and connects the two lateral roof frame parts 18 to each other.

Figure 3:
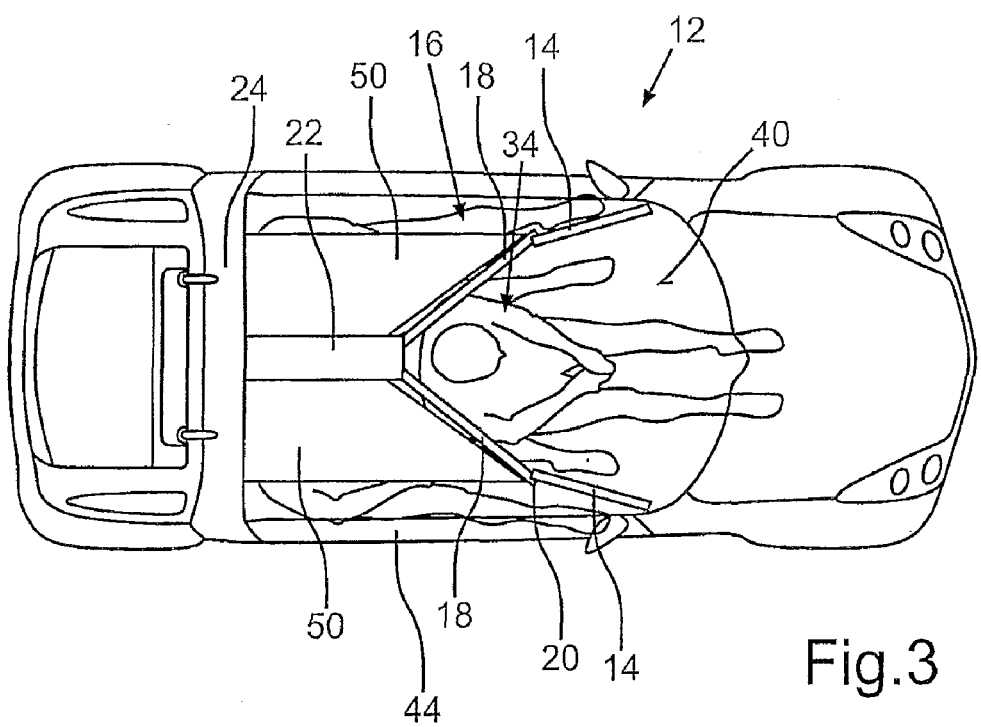
FIG. 3 a schematic top view of the motor vehicle according to FIGS. 1 and 2, wherein an alternative embodiment of the roof structure is shown, in which two roof elements are provided which are arranged laterally of the center roof frame part, which are formed in a detachable manner.

Furthermore, a front vehicle seat 38 can be seen in FIG. 3, which is arranged in the center of the body 10. In other words, only one vehicle seat 38 is provided in the front, which is positioned in the center.

By means of the roof frame element 16 that is arranged in a center region 34 so as to set back, a particularly safe seat position is achieved for the occupant of the front vehicle seat 38, as he is for example not moved against the roof frame element 16 during a forward dislocation caused by an accident or cannot impact it in particular with his head. It is rather ensured by the center region 34 of the roof frame element arranged in a manner so as to be set back that a sufficiently large free space is given with a front dislocation of the head of the seat occupant. It is furthermore achieved by the center region 34 that a larger opening can be realized for a windshield 40. A considerably better panorama view results hereby for the driver of the motor vehicle.

It can finally be seen in FIG. 1 that a vehicle floor 42 is provided between respective side sills, which extend between the wheels and which pass into the roll-over bar towards the rear, which floor is presently created by flat light building boards. Hereby, extruded sections, for example aluminum extruded sections are hereby conceivable in particular. The vehicle floor 42 can thereby consist of one and also of several light building boards. These light building boards have the advantage that they have a very good oscillation behavior and energy absorption capacity. The light building boards are further surprisingly suitable for cancelling vehicle noises. It is a further advantage that corresponding conduits can be laid within the hollow chambers of the light building boards or the hollow chambers themselves can serve as conduits. It shall be seen as encompassing within the scope of the invention that not only extruded sections can be used as light building boards, but for example also other types of sandwich elements.

Figure 2:
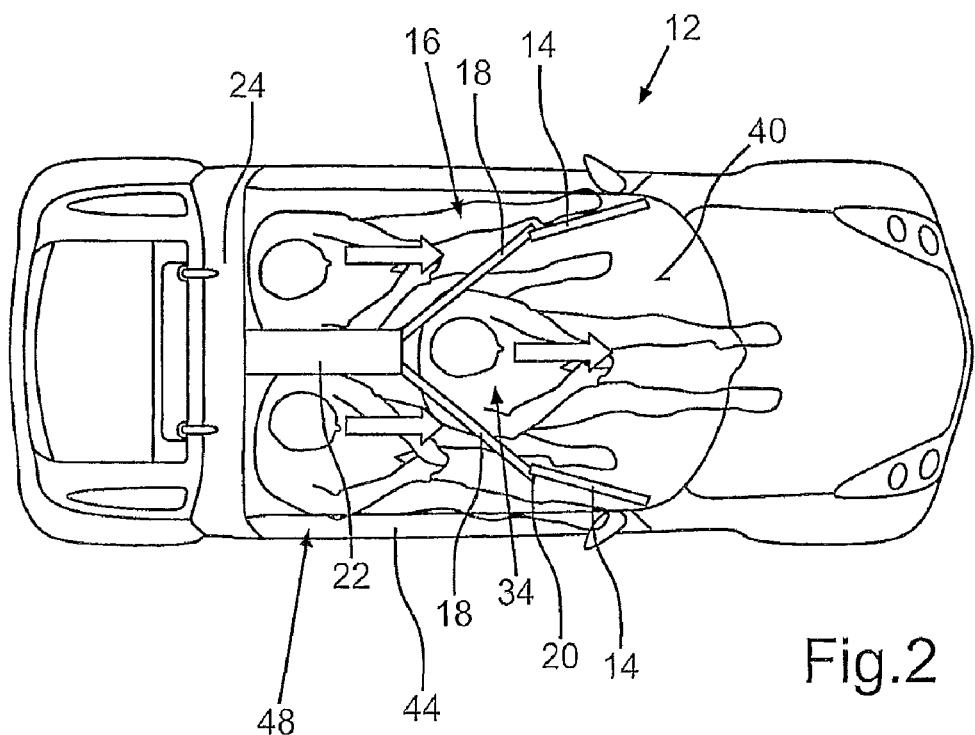
FIG. 2 is a schematic top view of the motor vehicle according to FIG. 1, wherein a second embodiment of the roof structure can be seen, in which the two lateral front roof frame parts are connected to each other to a Y-shaped basic contour via a center roof frame part.

Finally, respective body shell structures of side doors 44 can be seen in FIG. 2. The side doors 44 are presently attached to associated front wall pillars 46. It is thereby a specialty that no roof frame parts extend between the respective roof pillars 14 of the windshield frame and the roll-over bar 26. Their function is rather taken on by the roof frame element 16—consisting of the lateral roof frame parts 18 and the center roof frame part 22. Due to this reason, the side door 44 could extend over the side wall region into the roof region of the roof structure 12. It would possibly be conceivable that the side doors 44 reach up to the respective roof frame parts 18. It would thereby also be conceivable in particular to design the side doors 44 as wing doors, which can for example be attached at the center roof frame part 22.

In FIGS. 2 to 5, the motor vehicle according to FIG. 1 is shown respectively in a schematic top view, wherein respective alternative embodiments of the roof structure 12 are shown.

The embodiment according to FIG. 2 thus shows a design which is essentially identical to the embodiment according to FIG. 1. It can thereby be seen in particular that—seen in a top view—the lateral roof frame parts 18 are arranged at an angle to the respective roof pillar 14. The roof element 16, which extends in the continuation of the roof pillars 14, which is again designed in a fork-shaped manner or Y-shaped manner thus presently replaces the lateral roof frames and the roof frame transverse at the front, as is used with vehicles common nowadays.

In addition to the driver on the front vehicle seat 38, two passengers can be seen, who are positioned on respective vehicle seats 48 of a rear seat row. It can thereby be seen in FIG. 2 that the rear vehicle seats 48 or the seat occupants are arranged in a corresponding offset manner, wherein it can additionally be seen that an interfering roof frame is not arranged in any seat position of the driver or of the rear seat occupants. This is achieved with the driver in particular by means of the center region 34 of the roof frame element 16 arranged so as to be set back, and with the rear seat occupants by the center arrangement of the roof frame part. As thus no interfering roof frames or the like are arranged in the near region of the respective head, this roof structure 12 permits a vehicle roof that is designed in an extremely flat manner. However, with a forward dislocation of the occupants in the case of a frontal collision, a contact with a roof frame cannot take place.

The embodiment according to FIG. 3 is distinguished from the one according to FIG. 2 in that respective roof elements 50 are provided laterally of the center roof frame part 22, which extend on the outer side between the respective connecting region 22 of the front roof frame part 18 and the roll-over bar 22. In other words, the complete roof region of its roof structure 12 is essentially formed by the two roof elements 50. The roof elements 50 are thereby presently designed in a detachable manner, so that a vehicle concept according to the type of a targa can be created. The separation to the respective side doors 44 lies thereby between the roof elements 50 and the respective roof pillar 14.

In the embodiment according to FIG. 4, a roof structure 12 is provided, in which a particularly large windshield 40 according to the type of a panorama screen is provided. This is particularly achieved in that the lateral roof frame parts 18 of the roof frame element 16 essentially extend—seen in the top view—extend in the elongation or extension direction of the associated roof pillars 14. Furthermore, a center roof part 22 is chosen presently, which is designed wider compared to the embodiments of those in FIGS. 1 to 3.

FIG. 5 finally shows an alternative design to the embodiment according to FIG. 4, in which the center roof frame part 22 is formed wider. The separation to the respective side door 44 lies hereby between the center roof frame part 22 and the respective roof pillar 14. The side doors 44 drawn far into the roof region considerably ease the entry of the centrally seated driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A roof structure for a body of a motor vehicle with front roof pillars that are connected to each other by a roof frame element; wherein:
    the roof frame element is arranged in a center region of the roof structure relative to a connecting point to the respective roof pillars;
    whereby the roof frame element is set back rearwardly in the longitudinal vehicle direction,
    wherein the roof frame element comprises a center roof frame member extending approximately in the longitudinal vehicle direction, and
    wherein a front vehicle seat is arranged in the center of the body so that a head of an occupant of the front vehicle seat is arranged in front of the center roof frame member in the longitudinal vehicle direction.

2. The roof structure according to claim 1, wherein the roof frame element comprises two lateral roof frame parts, which extend towards the roof center diagonally starting from the corresponding connecting point to the corresponding roof pillar.

3. The roof structure according to claim 2, wherein the two lateral roof frame parts extend in the extension of the corresponding roof pillar.

4. The roof structure according to claim 1, wherein the roof frame element in the center region is set back by about one to two thirds of the length of the roof structure in the longitudinal vehicle direction.

5. The roof structure according to claim 1, wherein the roof frame element in the center region is set back by about half of the length of the roof structure in the longitudinal vehicle direction.

6. The motor vehicle body according to claim 1, wherein two rear vehicle seats are provided, which are laterally offset with regard to the front vehicle seat.

7. A roof structure for a body of a motor vehicle with front roof pillars that are connected to each other by a roof frame element; wherein:
   the roof frame element is arranged in a center region of the roof structure relative to a connecting point to the respective roof pillars;
   whereby the roof frame element is set back rearwardly in the longitudinal vehicle direction,
   wherein the roof frame element comprises two lateral roof frame parts, which extend towards the roof center diagonally starting from the corresponding connecting point to the corresponding roof pillar,
   wherein the roof frame element comprises a center roof frame member by which the two lateral roof frame parts are connected to each other.

8. The roof structure according to claim 7, wherein the center roof frame member extends approximately in the longitudinal vehicle direction.

9. The roof structure according to claim 7, wherein the center roof frame member is connected to a rear roof transverse element of the roof structure comprising a roll-over bar of the body.

10. The roof structure according to claim 7, wherein respective roof elements are detachably arranged laterally of the center roof frame member.

11. The roof structure according to claim 7, wherein side doors of the body extend in the region of the roof structure up to the center roof frame member.

12. The roof structure according to claim 11, wherein the side doors extend into the roof region of the roof structure.

* * * * *